United States Patent [19]

Stogner, Jr.

[11] Patent Number: 5,639,379
[45] Date of Patent: Jun. 17, 1997

[54] PROCESS FOR REMOVING COLOR AND ODOR FROM AQUEOUS EFFLUENT CONTAMINATED WITH TEXTILE DYE

[75] Inventor: Leonard E. Stogner, Jr., Concord, N.C.

[73] Assignee: Environmental Wastewater Services, Inc., Concord, N.C.

[21] Appl. No.: 677,040

[22] Filed: Jul. 8, 1996

[51] Int. Cl.$^6$ ................................. C02F 1/56; C02F 1/58
[52] U.S. Cl. ..................... 210/727; 210/759; 210/916; 210/917
[58] Field of Search .................................. 210/723, 725, 210/727, 759, 916, 917

[56] References Cited

U.S. PATENT DOCUMENTS

| | | |
|---|---|---|
| 1,088,063 | 2/1914 | Dreschsler . |
| 1,418,013 | 5/1922 | Newman . |
| 1,658,974 | 2/1928 | De Laporte et al. |
| 2,968,528 | 1/1961 | Tuttle et al. ........................ 23/165 |
| 3,361,528 | 1/1968 | Shen ................................. 23/165 |
| 3,399,136 | 8/1968 | Bell ................................. 210/50 |
| 3,483,120 | 12/1969 | Hatch ............................... 210/50 |
| 3,545,941 | 12/1970 | Wilson ............................. 23/312 |
| 3,578,587 | 5/1971 | Kemmer ............................ 210/52 |
| 3,721,624 | 3/1973 | Fisch et al. ....................... 210/47 |
| 3,901,804 | 8/1975 | Ohuchi et al. ..................... 210/50 |
| 4,005,011 | 1/1977 | Sweeny ............................. 210/917 |
| 4,045,171 | 8/1977 | Lancy .............................. 210/917 |
| 4,089,780 | 5/1978 | Svarz et al. ....................... 210/53 |
| 4,092,105 | 5/1978 | Sullins ............................. 8/81 |
| 4,163,716 | 8/1979 | Turnbull ........................... 210/917 |
| 4,194,973 | 3/1980 | Smith .............................. 210/917 |
| 4,377,508 | 3/1983 | Rothberg .......................... 252/631 |
| 4,800,039 | 1/1989 | Hassick et al. .................... 252/181 |
| 4,804,480 | 2/1989 | Jayawant .......................... 210/759 |
| 5,093,007 | 3/1992 | Domvile ............................ 210/713 |
| 5,178,774 | 1/1993 | Payne et al. ...................... 210/727 |
| 5,180,497 | 1/1993 | Sando et al. ...................... 210/917 |
| 5,202,028 | 4/1993 | Kermer et al. ..................... 210/917 |
| 5,360,551 | 11/1994 | Weber .............................. 210/917 |
| 5,376,151 | 12/1994 | Freeman et al. .................... 8/685 |
| 5,429,747 | 7/1995 | Carr et al. ........................ 210/917 |
| 5,529,697 | 6/1996 | Braasch et al. .................... 210/917 |

OTHER PUBLICATIONS

Beff et al. *Rev. Prog. Coloration*, "Metal–complex Dyes for Wool and Nylon – 1930 to date" vol. 14, pp. 33–42 (1984).

*Primary Examiner*—Neil McCarthy
*Attorney, Agent, or Firm*—Richard E. Jenkins, P.A.

[57] ABSTRACT

A process for removing both color and odor from wastewater effluent that is contaminated from dye complexes, such as azo dye complexes, used for dyeing textiles to be various colors. The process requires treatment of the effluent with alkali metal permanganate, followed by treatment with hydrogen peroxide, followed by treatment a primary coagulant as a flocculation initiator (together with pH control so that the pH is basic), followed by treatment with a water soluble polymer, and followed by separating precipitated flocculated material from the effluent to obtain a clear effluent free of color and odor.

16 Claims, No Drawings

PROCESS FOR REMOVING COLOR AND ODOR FROM AQUEOUS EFFLUENT CONTAMINATED WITH TEXTILE DYE

TECHNICAL FIELD

The present invention relates, in general, to removal of color from effluent, also known as wastewater. More particularly, the present invention relates to a process for removing color and odor from colored and odorous aqueous effluent containing color and odor from a textile dye, wherein the process requires certain sequential treatment steps culminating in flocculation with a water soluble polymer, followed by separating the flocculent from the resultant clarified effluent that is not only free of color, but that is also free of odor.

BACKGROUND OF THE INVENTION

As is well known, dye complexes, especially azo dye complexes, both the metallized kind and the non-metallized kind, are not environmentally friendly, although they are commercially important in the dyeing of textiles because the dyed textiles, particularly those dyed with metallized azo dye complexes, show excellent lightfastness, rubbingfastness, and washfastness.

In other words, there is a problem of water pollution from the azo dye complexes, not only from contaminants in the form of BOD (biological oxygen demand) and COD (chemical oxygen demand), but also from contaminants in the form of color bodies, that are discharged into public water supplies. An excellent background discussion of azo dye complexes, both the metallized kind and the non-metallized kind, can be seen in Beffa and Back, "Metal-Complex Dyes for Wool and Nylon—1930 to Date", Vol. 14, *Rev. Prog. Coloration*, pp. 33–42 (1984), and in U.S. Pat. No. 5,376,151 to Freeman et al. It is noted that metallized azo dye complexes typically employ metal ions such as chromium ion, copper ion, iron ion, cadmium ion, and cobalt ion.

Related to the problem that azo dye complexes create colored effluent is the problem that paper mills also create colored effluent. Of interest in connection with removal of color from paper mill wastewaters are U.S. Pat. No. 3,578,587 to Kemmer and U.S. Pat. No. 4,089,780 to Svarz et al. More specifically, the patent to Kemmer shows a process for using a substantially lesser amount of lime ($CaCO_3$), together with an anionic water-soluble polymer having a molecular weight of at least 100,000 for treating effluent from paper mills in order to remove color as a precipitate. Also, the patent to Svarz et al. shows a process for using a water-soluble polyamine, followed by a water-soluble anionic or non-ionic organic polymer having a molecular weight of at least 10,000 for treating paper mill effluent to remove color as a precipitate.

Additionally, of interest in connection with polymeric treatment of effluent is U.S. Pat. No. 5,178,774 to payne et al. Disclosed is a process for separating coagulatable material from an aqueous suspension by employing an ionic polymer in the form of dry solid particles.

Of note, treatment of effluent with potassium permanganate is shown in U.S. Pat. No. 1,088,063 to Drechsler and U.S. Pat. No. 3,483,120 to Hatch. It is interesting that U.S. Pat. No. 3,483,120 to Hatch specifically teaches, at lines 69–72 of column 2, that "certain anionic polymers are shown to be relatively inefficient, as compared to cationic polymers, when employed conjunctively with the permanganate."

Furthermore, treatment of effluent with hydrogen peroxide as an oxidizing agent is shown in U.S. Pat. No. 3,361,528 to Shen; U.S. Pat. No. 3,721,624 to Fisch et al.; and U.S. Pat. No. 4,804,480 to Jayawant.

Finally, of interest with respect to treatment of effluent is U.S. Pat. No. 4,800,039 to Hassick et al. Disclosed is a composition for reducing turbidity in aqueous systems, the composition being a combination of aluminum chlorohydrate, together with either one or both of certain kinds of polyamines or certain kinds of dialkyl diallyl ammonium polymers.

The disclosures of all of the above-mentioned patents are incorporated herein by reference.

SUMMARY AND OBJECTS OF THE INVENTION

Accordingly, the present invention provides a process for removing color and odor from colored and odorous aqueous effluent containing color and odor from a textile dye. The process comprises treating the aqueous effluent with an alkali metal permanganate in an amount sufficient to provide for a pink color to remain in the effluent, followed by treating the resultant with hydrogen peroxide in an amount sufficient to provide for the pink color to disappear from the liquid portion of the effluent and be observed as a very fine solid suspended throughout the effluent. The process next comprises treating the resultant from the hydrogen peroxide treatment with a primary coagulant as a flocculation initiator in an amount sufficient to provide for well defined small flocculent particles to be precipitated, with a clear, colorless liquid above, and including a pH adjusting agent to adjust the pH to be basic from above about 7.0 up to about 9.0. Finally, the process comprises treating the resultant (from the treatment with primary coagulant and pH agent) with a water soluble polymer in an amount sufficient to provide for large, flocculated particles to be precipitated, with a clear, colorless, and odorless liquid above, and then, separating the large, precipitated flocculated particles from the effluent to obtain a clear aqueous effluent free of color and odor.

In a particular embodiment, the present invention also provides a process for removing color and odor from colored and odorous aqueous effluent containing color and odor from a textile dye, where the process comprises the steps of: (A) potassium permanganate treatment, (B) hydrogen peroxide treatment, (C) aluminum chlorohydrate treatment including pH treatment, (D) water soluble polymer treatment, and (E) separating flocculated particles. In step (A), the aqueous effluent is treated with potassium permanganate in an amount ranging from about 100 to about 200 mg/liter. In step (B), the resultant from step (A) is treated with hydrogen peroxide in an amount ranging from about 20 to about 30 mg/liter. In step (C), the resultant from step (B) is treated with an aqueous solution of aluminum chlorohydrate in an amount sufficient to provide an amount of aluminum chlorohydrate ranging from about 75 mg/liter to about 125 mg/liter, and including a pH adjusting agent to adjust the pH to be basic from above about 7.0 up to about 9.0. In step (D), the resultant from step (C) is treated with a water soluble polymer, having a water solubility of at least about 10 g/liter, in an amount ranging from about 50 to about 100 mg/liter to create a precipitated flocculated material. In step (E), the precipitated flocculated material is separated from the effluent to obtain a clear aqueous effluent free of color and odor. It is an object of the invention for the treated effluent to be not only clear and colorless, but also odorless.

An advantage of the inventive process is that it avoids chlorine bleaching, which is commonly used for removal of color from effluent, and thus, avoids the drawback of the chlorine causing the color bodies to change into chlorinated by-products that are detrimental to the environment.

An object and an advantage of the invention having been stated above, other objects and advantages will become evident as the description proceeds, when taken in connection with the accompanying Examples as best described below.

DETAILED DESCRIPTION OF THE INVENTION

The present invention is directed to a process that removes both color and odor from a colored and odorous aqueous effluent that contains color and odor from a textile dye.

As is well known in the textile and dyestuffs industries, there are various means by which effluent can be contaminated with color and odor from textile dyes. Thus, the source of the color and odor from the textile dye may be one or more of an azo dye complex, a process of making the azo dye complex, the azo dye complex in a textile dyed with the azo dye complex, and the process of dyeing textiles with the azo dye complex, but is not limited to these sources. Typically, the effluent will be very dark and opaque from the pollution caused by the textile dye.

By the phrase "textile dye" as here employed, is meant any of the various dye complexes, including the azo dye complexes that are metallized, non-metallized, or a combination thereof, which are employed in the dyeing of textiles, such as those discussed in the above-mentioned journal article entitled "Metal-Complex Dyes for Wool and Nylon— 1930 to Date" by Beffa and Back and in the above-mentioned U.S. Pat. No. 5,376,151 to Freeman et al. It is noted that such azo dye complexes are well known to the person of ordinary skill in the art of dyeing textiles, and it is not intended to be limited to those specifically disclosed in the journal article or in the patent.

By the word "textile" as here employed, it is intended to include, but not be limited to, fabrics, fibers, yarns, and the like, which may be made of natural materials such as wool or cotton, or may be made of synthetic materials such as nylon polymers (i.e., polyamides) or acrylic polymers.

The process for removing color and odor requires 5 steps that must be performed in order as follows.

For all steps, as is well known in the art of effluent treatment, the time may vary depending on the total amount of effluent being treated, and shorter times may be employed for smaller samples or longer times for larger samples. The effluent should be in container, such as a reaction tank or the like, for convenience in carrying out the process.

First, to a colored and odorous sample of aqueous effluent, that contains color and odor from a textile dye, is added an alkali metal permanganate, such as potassium permanganate, in an amount sufficient for a pink color to remain in the treated effluent. A suitable amount may range from about 100 mg/liter to about 200 mg/liter, more preferably about 125 mg/liter to about 175 mg/liter, and most preferably about 150 mg/liter of effluent.

The alkali metal permanganate may be added to the tank by a feed pump, and during the feeding, the oxidation/reduction potential of the feed may be controlled by known means. The addition of the alkali metal permanganate should be with stirring, which may be suitably accomplished by air or mechanical mixing in the reaction tank. Also, the addition of the alkali metal permanganate should not be preceded by the addition of a precipitating agent, a coagulating agent, a flocculating agent, or the like.

Typically, the reaction time with alkali metal permanganate is about 40 minutes, after which a pink color remains in the treated effluent at the end of a 30 minute residence time. In particular, about 30 to about 80 minutes of residence time is suitable.

Second, hydrogen peroxide is added to the resultant effluent from the permanganate treatment in an amount sufficient for the pink tint to disappear from the liquid portion of the sample and be observed as very fine solid particles suspended throughout the sample. The liquid portion of the sample should then be clear and colorless. A suitable amount may range from about 20 mg/liter to about 30 mg/liter, more preferably about 22 mg/liter to about 28 mg/liter, and most preferably about 25 mg/liter of effluent.

The hydrogen peroxide may be added to the tank by a feed pump, and during the feeding, the oxidation/reduction potential of the mixture may be controlled. The addition of the hydrogen peroxide also should be with stirring, which may be accomplished with air or mechanical stirring. In particular, a residence time of about 30 minutes to about 60 minutes is suitable.

Third, the resultant effluent from the hydrogen peroxide treatment is then treated with a primary coagulant to initiate flocculation of the suspended particles, such as aluminum chlorohydrate. Addition of aluminum chlorohydrate as the primary coagulant may suitably be accomplished by employing aluminum chlorohydrate in a 50% by weight aqueous solution. The aqueous solution of aluminum chlorohydrate may be added with a feed pump to the reaction tank. The feeding may be constant, or alternatively, during the feeding, the oxidation/reduction potential of the feed may be controlled by known means.

The treatment amount of the aqueous solution of aluminum chlorohydrate being added should be sufficient to provide an amount of aluminum chlorohydrate sufficient for well defined, small flocculated particles to be precipitated with a clear, colorless liquid above. Suitably, the amount may range from about 75 mg/liter to about 125 mg/liter, more preferably about 88 mg/liter to about 113 mg/liter, most preferably about 100 mg/liter of effluent, particularly when the primary coagulant is aluminum chlorohydrate.

The step of treatment with a primary coagulant, such as aluminum chlorohydrate, should include pH control achieved by including a sufficient amount of pH adjusting agent to adjust the pH to be basic from above about 7.0 up to about 9.0, more preferably between about 7.5 and about 8.5. A suitable pH adjusting agent is hydrated lime (also known as calcium carbonate) in an amount sufficient to achieve the desired pH. A typical amount is about 100 mg/liter of effluent, but of course, varies depending on the amount of aluminum chlorohydrate or other primary coagulant being added. The pH adjusting agent may be added with a feed pump to the reaction tank, and during the feeding, the oxidation/reduction potential of the feed may be controlled by known means.

The primary coagulant and the pH adjusting agent should be added with mixing, which may be accomplished by air or mechanical mixing.

A typical residence time ranges from about 30 minutes to about 60 minutes. Usually, in about 15 minutes, the flocculent particles should start to settle, and continue to settle till they are below about 50% sample volume and above them is a clear, colorless supernatant.

Fourth, a water soluble polymer is added to the resultant effluent from the treatment with both a primary coagulant and a pH adjusting agent. The water soluble polymer should have a water solubility of at least about 10 g/liter, and suitably may be an anionic polymer with an average molecular weight of at least about 10,000. Suitable water soluble anionic polymers with an average molecular weight of at least about 10,000 may be selected from the group consisting of carboxylic acid polymers, carboxylic acid anhydride polymers, carboxylic acid salt polymers, sulfonic acid polymers, sulfonic acid salt polymers, phosphonous polymers, phosphonic acid polymers, phosphonic acid salt polymers, and combinations thereof. The carboxylic moiety may be an acrylic moiety.

The water soluble polymer should be added in an amount sufficient to create a precipitated flocculated material of very large, flocculated particles with a clear, colorless, and odorless liquid above. Suitably, the amount may range from about 50 mg/liter to about 100 mg/liter, more preferably about 60 mg/liter to about 90 mg/liter, and most preferably about 75 mg/liter of effluent.

The water soluble polymer may be added with a feed pump to the reaction tank, and should be added with mixing, which may be accomplished by air or mechanical mixing. If air or mechanical mixing is employed, then, the feeding of the water soluble polymer should be constant. Alternatively, if dissolved air flotation is used for injection of the water soluble polymer down stream of the aeration tank, then, a mechanical mixer should be employed together with the constant feeding.

A typical residence time ranges from about 30 minutes to about 120 minutes. Usually, in about 1 minute or less, the very large, flocculated particles should begin to settle and continue to settle till they are about 3% to about 4% of the total sample volume and above them is a clear, colorless, and odorless supernatant having a turbidity less than about 5.0 ntu.

It is noted that the term "small" as used in connection with the flocculent from the third step (i.e., the primary coagulant step) and the term "large" as used in connection with the flocculent from the fourth step (i.e., the water soluble polymer step) are intended to mean the relative volume size of the two resultant flocculents with respect to each other.

Fifth, the precipitated flocculated material is separated from the supernatant portion of the effluent to obtain a modified aqueous effluent free of color and odor. Any of the well known processes for separating a precipitate from a supernatant may be employed, including, but not limited to, floatation, skimming, scraping, filtering, decanting, and the like.

The following examples were performed.

EXAMPLES

Example I (Comparison)

This was a comparison example showing treatment, by a standard prior art biological wastewater treatment process using aeration, of wastewater from a factory that dyes acrylic hosiery and cotton hosiery with non-metallized azo dye complexes and markets the dyed hosiery.

Prior to any treatment, a sample of the wastewater was analyzed and found to contain a BOD value of 367.0 mg/liter, a COD value of 1101 mg/liter, a TSS (total suspended solids) value of 400.0 mg/liter, a total phosphorous of 0.25 mg/liter, and a combined oil and grease value of 16.8 mg/liter.

For the treatment, a sample of the wastewater was seeded with 9000 parts per million of activated sludge and observed for 153 hours. More particularly, upon addition of the seed sludge, the sample was aerated continuously (except for the times that samples were taken) for 153 hours with sufficient diffused air to maintain a dissolved oxygen level between about 2.0 and 4.0 mg/liter. At selected intervals, aeration was halted for 30 minutes and the solids were allowed to settle. Samples of the supernatant were then analyzed and the aeration resumed.

The results of the analysis of the supernatant are summarized and compared to the initial sample prior to treatment in the following Table I.

TABLE I

| DAY | TIME OF DAY | DURATION HOURS | BOD (mg/l) | COD (mg/l) | TSS (mg/l) | TOTAL PHOS. (mg/l) | OIL & GREASE (mg/l) |
|---|---|---|---|---|---|---|---|
| 1 | 0800 | Initial | 367.0 | 1101.0 | 400.0 | 0.25 | 16.8 |
| 2 | 0800 | 24 | 743.0 | 725.0 | 340.0 | | |
| 2 | 1600 | 32 | 504.0 | 1263.0 | 500.0 | | |
| 3 | 0800 | 48 | 475.0 | 1020.0 | 300.0 | | |
| 3 | 1700 | 57 | 464.0 | 947.0 | 300.0 | | |
| 4 | 0800 | 72 | 424.0 | 1061.0 | 280.0 | | |
| 4 | 1700 | 81 | 422.0 | 1024.0 | 320.0 | | |
| 7 | 1700 | 153 | 340.0 | 971.0 | 250.0 | | |

As can be seen from reviewing the above Table I, values fluctuated throughout the study. However, they were never significantly reduced below the initial levels. More specifically, after 6 days of continuous biological treatment by aeration, the sludge exhibited moderately good settlement, but the supernatant remained a very dark color. This dark color in the supernatant indicated the presence of color bodies that were stable compounds and/or ions that could not be biologically decreased. Nevertheless, although a significant decrease in odor was observed, the oily sheen present in the initial sample remained.

In conclusion, the standard prior art treatment of wastewater by the biological wastewater treatment process of aeration accomplished neither a decrease in BOD, COD, and TSS, nor a removal of the dark color.

Example II

A sample of wastewater effluent from the same factory as indicated in Example I above was used in Example II. The typical chemicals employed by this factory in the dyeing of hosiery are as follows:

TABLE IIA

Chemicals Used in Dyeing Hosiery

| Chemical Description | Trade Name or Generic Description |
|---|---|
| Acrylic leveler | Dyeassist 2106 |
| Acrylic leveler | Vircryl AD46 |
| 56 weight % aqueous $CH_3COOH$ | pH adjusting agent |
| Acrylic softener | Marksoft XAQ |
| 12.5 weight % NaOCl | Bleach for cotton |
| 35 weight % $H_2O_2$ | Bleach |
| Softener for cotton | Vircosoft MAH |
| Foam removal agent | Defoamer S-5 |
| Lubricant/softener | Vircosoft 348 |
| Cotton wetting agent | Linwet C |
| Detergent for oils | Lincoscour GRA |
| Whitener | Optical 91 |
| Acrylic whitener | Synthrowite OR |
| Iron conditioner | Vircoquest FE 200 |
| Fixing agent for direct dyes | Ultrafix G400 |
| EDTA sequestering agent* | Vircoquest D |

*EDTA is an abbreviation for ethylene diamine tetra acetic acid.

The sample of wastewater effluent had a very dark, opaque color, almost black, and a very rank odor from the non-metallized azo dye complexes. The sample was placed in a reaction tank and treated in the following manner.

Step 1

Approximately 150 mg/liter of potassium permanganate ($KMnO_4$) was added with stirring to the tank containing the sample until a pink color was observed as remaining in the sample at the end of a 30 minute residence time. (The observation of the pink was accomplished with a qualitative determination made visually by the person performing the test, not with quantitative determination made by a colorimeter.) Total reaction time was 40 minutes.

Step 2

Hydrogen peroxide ($H_2O_2$), in an amount of approximately 25 mg/liter, was added with stirring to the resultant from step 1. The reaction was almost instantaneous for the pink tint to disappear from the liquid portion of the sample and instead be observed as a very fine solid particles suspended throughout the sample. The liquid portion of the sample was clear and colorless.

Step 3

Aluminum chlorohydrate, as approximately 200 mg/liter of an aqueous solution of 50 weight % aluminum chlorohydrate, was added with stirring to the resultant from step 2. The aqueous solution of 50 weight % aluminum chlorohydrate was purchased from Summit Research Labs of Somerset, N.J. and had CAS Number 12042-91-0. The pH of the sample was increased to between 7.5 and 8.5 by addition of approximately 100 mg/liter hydrated lime (CaC03). At this point, well defined small flocculated particles were present in a clear liquid. The flocculated particles settled to below 50% sample volume in 15 minutes, and above them was a clear and colorless supernatant.

Step 4

A water soluble polymer was added to the resultant from step 3 in an amount of approximately 75 mg/liter. The water soluble polymer used was purchased from Industrial Maintenance Corporation of Charlotte, N.C., which sells this polymer under the trade name LS 881. LS 881 has a water solubility of 10 g/liter.

This addition resulted in a precipitate of very large, flocculated particles, which were difficult to keep suspended. The particles settled to approximately 3 to 4% of the total sample volume in less than 1 minute, with a very clear, colorless, and odorless supernatant above the particles. Supernatant turbidity was less than 5.0 ntu (nephelometric turbidity units).

Step 5

The supernatant was decanted from the precipitated flocculated material of Step 4. The decanted liquid was clear and colorless, and also free of odor. An aliquot of the decanted liquid was analyzed for contaminants, and the results compared to the analysis of contaminants in the initial effluent prior to treatment, as summarized in the following Table IIB.

TABLE IIB

SAMPLE CHARACTERISTICS

| PARAMETER | INITIAL (mg/liter) | AFTER TREATMENT (mg/liter) |
|---|---|---|
| BOD | 272.00 | 8.20 |
| TSS | 115.00 | 65.00 |
| Oil and Grease | 16.80 | <1.00 |
| Phenol | 0.05 | 0.01 |
| COD | 922.00 | 430.00 |
| Total Phosphorous | 0.36 | <0.10 |
| Chromium Ion | 0.05 | 0.03 |
| Copper Ion | 0.04 | 0.04 |
| Zinc Ion | 0.15 | 0.08 |
| Cadmium Ion | <0.01 | <0.01 |
| Lead Ion | 0.08 | <0.05 |
| Nickel Ion | 0.05 | <0.05 |
| pH | 7.03 | 8.05 |

It will be understood that various details of the invention may be changed without departing from the scope of the invention. Furthermore, the foregoing description is for the purpose of illustration only, and not for the purpose of limitation—the invention being defined by the claims.

What is claimed is:

1. A process for removing color and odor from colored and odorous aqueous effluent containing color and odor from a textile dye, said process comprising the following steps:

(A) treating the aqueous effluent with an alkali metal permanganate in an amount sufficient to provide for a pink color to remain in the effluent;

(B) treating the resultant from step (A) with hydrogen peroxide in an amount sufficient to provide for the pink color to disappear from the liquid portion of the effluent and to observe very fine solid particles suspended throughout the effluent;

(C) treating the resultant from step (B) with a primary coagulant as a flocculation initiator in an amount sufficient to provide for well defined small flocculent particles to be precipitated, with a clear, colorless liquid above, and including a pH adjusting agent to adjust the pH to be basic from above about 7.0 up to about 9.0;

(D) treating the resultant from step (C) with a water soluble polymer in an amount sufficient to provide for large, flocculated particles to be precipitated, with a clear, colorless, and odorless liquid above; and (E) separating the large, precipitated flocculated particles from the effluent to obtain a clear aqueous effluent free of color and odor.

2. The process of claim 1, wherein the textile dye in the effluent is provided by a source selected from the group consisting of an azo dye complex, a process of making the azo dye complex, the azo dye complex in a textile dyed with the azo dye complex, the process of dyeing textiles with the azo dye complex, and combinations thereof.

3. The process of claim 2, wherein the azo dye complex is selected from the group consisting of a metallized azo dye complex, a non-metallized azo dye complex, and a combination thereof.

4. The process of claim 3, wherein the metallized azo dye complex has a metal ion selected from the group consisting of chromium ion, copper ion, iron ion, cadmium ion, cobalt ion, and combinations thereof.

5. The process of claim 1, wherein the alkali metal permanganate is potassium permanganate.

6. The process of claim 5, wherein the amount of potassium permanganate ranges from about 100 to about 200 mg/liter.

7. The process of claim 1, wherein the amount of hydrogen peroxide ranges from about 20 to about 30 mg/liter.

8. The process of claim 1, wherein the primary coagulant is aluminum chlorohydrate.

9. The process of claim 8, wherein the amount of aluminum chlorohydrate ranges from about 75 mg/liter to about 125 mg/liter.

10. The process of claim 1, wherein the amount of water soluble polymer ranges from about 50 to about 100 mg/liter.

11. The process of claim 1, wherein the water soluble polymer has a water solubility of at least about 10 g/liter.

12. The process of claim 1, wherein the water soluble polymer is an anionic polymer with an average molecular weight of at least about 10,000.

13. The process of claim 12, wherein the water soluble anionic polymer is selected from the group consisting of carboxylic acid polymers, carboxylic acid anhydride polymers, carboxylic acid salt polymers, sulfonic acid polymers, sulfonic acid salt polymers, phosphonous polymers, phosphonic acid polymers, phosphonic acid salt polymers, and combinations thereof.

14. The process of claim 13, wherein polymers with a carboxylic moiety are acrylic polymers.

15. The process of claim 1, wherein separating the large, precipitated flocculated particles from the effluent to obtain a clear aqueous effluent free of color and odor is accomplished by floatation, skimming, scraping, filtering, decanting, and combinations thereof.

16. A process for removing color and odor from colored and odorous aqueous effluent containing color and odor from a textile dye, said process comprising the following steps:

(A) treating the aqueous effluent with potassium permanganate in an amount ranging from about 100 to about 200 mg/liter;

(B) treating the resultant from step (A) with hydrogen peroxide in an amount ranging from about 20 to about 30 mg/liter;

(C) treating the resultant from step (B) with an aqueous solution of aluminum chlorohydrate in an amount sufficient to provide an amount of aluminum chlorohydrate ranging from about 75 mg/liter to about 125 mg/liter, and including a pH adjusting agent to adjust the pH to be basic from above about 7.0 up to about 9.0;

(D) treating the resultant from step (C) with a water soluble polymer, having a water solubility of at least about 10 g/liter, in an amount ranging from about 50 to about 100 mg/liter to create a precipitated flocculated material; and (E) separating the precipitated flocculated material from the effluent to obtain a clear aqueous effluent free of color and odor.

* * * * *